(12) United States Patent
Tse (10) Patent No.: US 6,928,508 B2
(45) Date of Patent: Aug. 9, 2005

(54) METHOD OF ACCESSING A REMOTE DEVICE FROM A HOST BY MAPPING AN ADDRESS OF THE DEVICE TO A MEMORY ADDRESS OF THE HOST

(75) Inventor: Dawn Y. Tse, Mill Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 392 days.

(21) Appl. No.: 10/255,873

(22) Filed: Sep. 25, 2002

(65) Prior Publication Data

US 2004/0054842 A1 Mar. 18, 2004

Related U.S. Application Data

(60) Provisional application No. 60/410,262, filed on Sep. 12, 2002.

(51) Int. Cl.$^7$ .......................... G06F 13/00; G06F 13/20
(52) U.S. Cl. ....................... 710/313; 710/315
(58) Field of Search ................. 710/300–306, 710/105, 313, 314, 36, 48, 260, 315; 712/207; 713/1, 100; 709/250; 370/401–402, 911

(56) References Cited

U.S. PATENT DOCUMENTS

| 5,499,346 | A | * | 3/1996 | Amini et al. ................ 710/311 |
| 5,960,213 | A | * | 9/1999 | Wilson ........................... 710/2 |
| 6,314,525 | B1 | * | 11/2001 | Mahalingham et al. ......... 714/4 |
| 6,658,521 | B1 | | 12/2003 | Biran |
| 6,662,242 | B2 | * | 12/2003 | Holm et al. .................... 710/9 |
| 6,704,831 | B1 | * | 3/2004 | Avery ........................... 710/310 |
| 6,708,273 | B1 | * | 3/2004 | Ober et al. .................. 713/189 |

FOREIGN PATENT DOCUMENTS

| EP | 1 043 876 A1 | 10/2000 |
| EP | 1 049 012 A1 | 11/2000 |
| WO | WO 01/18654 | 3/2001 |
| WO | WO 01/18988 A1 | 3/2001 |
| WO | WO 01/18989 | 3/2001 |
| WO | WO 02/41157 A1 | 5/2002 |

OTHER PUBLICATIONS

"Reconfigurable hardware as shared resource for parallel threads" by Haug, G. ; Rosenstiel, W. (abstract only) Publication Date: Apr. 15–17, 1998.*

"A PC–based instrumentation board that overcomes many drawbacks of typical commercial data acquisition systems for electrophysiological recording applications" by Martel, S.; Lafontaine, S.; Hunter, I. (abstract only) Publication Date: Oct. 25–28, 2001.*

Themis Computer: "TPSX–4 PCI Expansion Fact Sheet", Online Products Page, 'Online! 20–20 Aug. 2002, pp. 1–1, XP002273223 Retrieved from the Internet: <URL:http://web.archive.org/web/20020820071234/www.themis.com/products/hardware/TPX4PCIExpan.html>.

Avery James M: InfiniBand to PCI Bridge TCA Need to Know, May 9, 2000, XP002197326 Retrieved from the Internet: <URL:http://www.sun.com/io_technologies/docs/PCI_To_IB_HANDOUT2.pdf>.

* cited by examiner

Primary Examiner—Gopal C. Ray
(74) Attorney, Agent, or Firm—Park, Vaughan & Fleming LLP (57) ABSTRACT

A protocol for facilitating access to a local input/output device of a remote node across a network. The local input/output device is configured according to a local communication technology (e.g., PCI—Peripheral Component Interconnect), but is accessed remotely (e.g., across a set of InfiniBand (IB) communication links). A host server or other computer (e.g., an InfiniBand host) includes a channel adapter and a nexus driver for conveying or retrieving an instruction of a device driver for the local device across the network. The remote node includes a local/remote bridge (e.g., an IB/PCI bridge). The host connects to the remote node and determines a configuration of the node's local communication bus and the local input/output device. A host memory address is mapped to a local bus address and is used by the input/output device to exchange data with the host.

33 Claims, 3 Drawing Sheets

METHOD OF ACCESSING A REMOTE DEVICE FROM A HOST BY MAPPING AN ADDRESS OF THE DEVICE TO A MEMORY ADDRESS OF THE HOST

RELATED APPLICATION

This application claims priority to U.S. Provisional Application Ser. No. 60/410,262, filed on Sep. 12, 2002, which is hereby incorporated by reference.

BACKGROUND

This invention relates to the field of computer systems. More particularly, a system and methods are provided for remotely accessing input/output devices configured for local access (e.g., PCI devices).

InfiniBand™ is an input/output technology for interconnecting computers, storage devices, communication equipment and other devices. InfiniBand allows input/output communications to be performed over relatively long distances, thereby freeing a host computer to access and use devices that are not local to the host. For example, InfiniBand host computers may be interconnected with separate input/output systems and subsystems. As the InfiniBand specification grows in popularity, more and more devices will be configured for operation with InfiniBand interconnections.

Presently, however, a large number of input/output devices are configured for only local access (e.g., within a single computer system). For example, the PCI (Peripheral Component Interconnect) standard provides a local communication bus for connecting devices within a computer system (e.g., for storage, communication). Such devices are not presently configured for control or use by remote host computers via a network input/output environment such as that provided by InfiniBand.

Thus, there is a need for a system and method of accessing and managing existing input/output devices configured for local access (e.g., according to PCI or other such standards) from a remote (e.g., InfiniBand) host.

SUMMARY

In one embodiment of the invention, a protocol is provided for facilitating control of, and access to, a local storage device of a remote node across a network or series of input/output connections. In particular, a local storage device may be configured according to a local communication technology (e.g., PCI—Peripheral Component Interconnect), but may be accessed across an InfiniBand (IB) interface or through some other communication environment.

A host server or other computer (e.g., an InfiniBand host) includes a first bridge (or channel adapter) for accessing a set of input/output interconnections (e.g., an InfiniBand fabric), and a nexus driver for translating between the instructions of a device driver for the local storage device and the protocol stack of the input/output interconnections. The remote node includes another bridge (or channel adapter) for interfacing between the input/output interconnections and its local communication bus. The host connects to the remote node and determines a configuration of the node's local bus and the storage device. A host memory address is mapped to a local bus address and is used by the device to exchange data with the host.

In an embodiment of the invention, the host first connects to a hot plug controller of the remote node, to determine and/or change a configuration of one or more interface slots of the local bus. The host subsequently establishes connections to one or more devices on the bus. Also, the host registers with the remote node (e.g., the bridge) the ability to handle interrupts from one or more of the hot plug controller, the local bus, and a device on the local bus.

The host loads a device driver associated with the local storage device of the remote node, and the nexus driver translates the device driver's commands into appropriate messages to the remote node. Illustratively, InfiniBand SEND messages may be used to communicate from the host to the node. The remote node may return a response or status to the host.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer, computer server, and/or a special purpose device such as an input/output subsystem or collection of input/output devices. Details of such devices (e.g., processor, memory, data storage, display) may be omitted for the sake of clarity.

It should also be understood that the techniques of the present invention may be implemented using a variety of technologies. For example, methods described herein may be implemented in software executing on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In an embodiment of the invention, a system and method are provided for accessing and controlling an input/output device of a remote node from a network host computer. The device may be configured according to the PCI (Peripheral Component Interconnect) standard or some other standard designed for local communications involving an input/output device. The remote node may be a general-purpose computer (e.g., a desktop, a workstation), an input/output subsystem (e.g., a RAID—Redundant Array of Inexpensive Disks) or other system comprising one or more input/output devices and a local communication bus.

In one embodiment, the network comprises InfiniBand (IB) input/output interconnections and the host is a server. The server executes a PCI (or other) driver for controlling the remote device. Commands issued by the device driver are translated, then transmitted to the remote node by a bridge (e.g., an IB/PCI bridge), channel adapter or network interface. At the remote node, the command is executed, and any response or reply is returned to the host, translated back into PCI (or other) format and provided to the device driver.

The remote device can therefore be operated as if it were local to the host. Although the device driver and device send and receive their normal commands, those commands are translated or converted for transmission between the host and the remote node according to the operative protocol stack for the interconnection(s) between the host and remote node. One or more embodiments of the invention are described below as they may be implemented in an InfiniBand input/output fabric, for local input/output devices configured according to the PCI standard. Other embodiments may be implemented for other network and communication technologies and standards.

Figure 1:
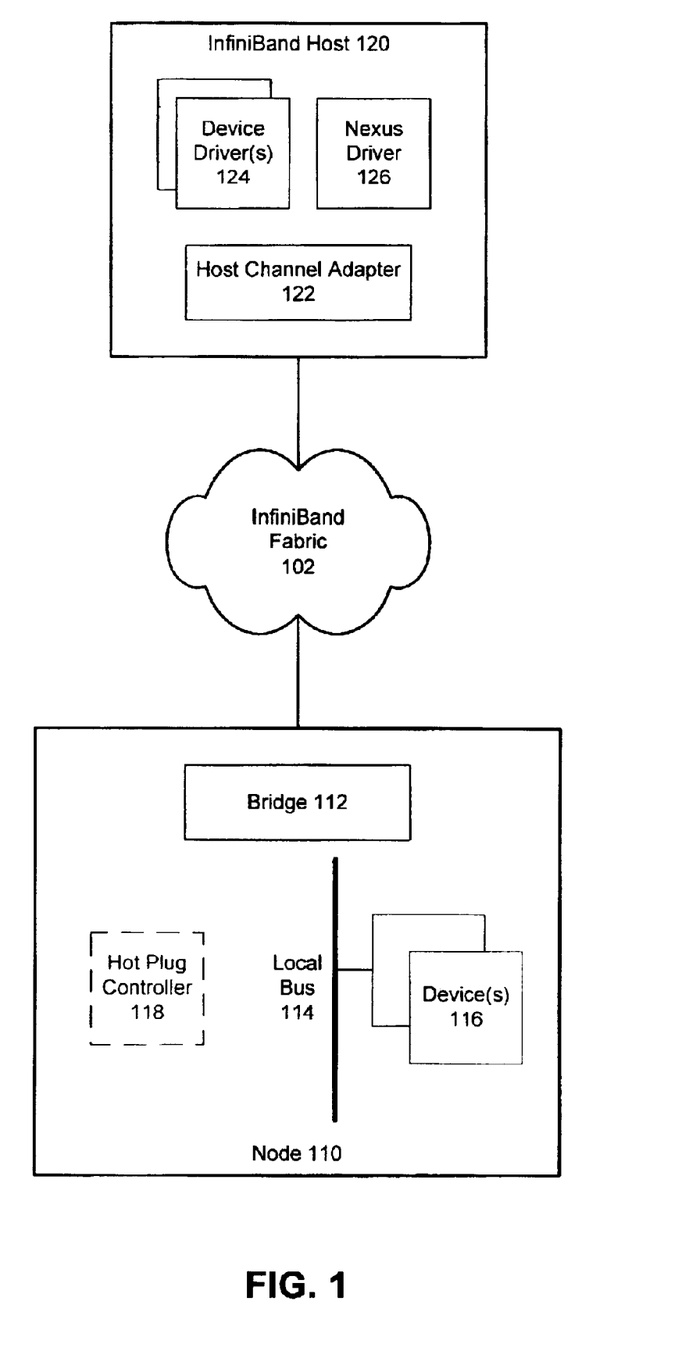
FIG. 1 is a block diagram depicting a communication environment in which an embodiment of the present invention may be implemented.

FIG. 1 illustrates an InfiniBand environment in which an embodiment of the invention may be implemented. In the environment of FIG. 1, InfiniBand fabric 102 may comprise communication links and equipment (e.g., switches, routers) for interconnecting virtually any number of nodes. Nodes coupled to fabric 102 may include host computers or servers, such as InfiniBand host 120, other computer systems, input/output subsystems (e.g., collections of input/output devices), and other entities (e.g., switches, routers).

In FIG. 1, node 110 may be a personal computer, workstation, disk array, or other comparable piece of equipment. Node 110 includes bridge 112, local bus 114 and one or more input/output devices 116. Node 110 may also include hot plug controller 118 for monitoring the status of slots on local bus 114 and enabling the hot-swapping of devices.

Bridge 112 is an IB/PCI bridge for interfacing between InfiniBand and the local bus. The bridge may comprise an InfiniBand target channel adapter (TCA), a processor configured to translate communication formats between InfiniBand and the format of local bus 114, or some other device(s) capable of communicating via InfiniBand with host 120 and via some other communication specification (e.g., PCI) with local bus 114.

Local bus 114 may be a PCI segment, bus, backplane or midplane, or may be configured for some other local input/output communication specification (e.g., ISA, EISA). Devices 116 may include disk drives, tape drives and/or other devices employing virtually any media (e.g., magnetic, optical, solid-state) or format (e.g., SCSI—Small Computer System Interface, ATA—Advanced Technology Attachment).

InfiniBand host 120 comprises host channel adapter (HCA) 122 for accessing InfiniBand fabric 102, one or more local device drivers 124, and nexus driver 126. In an alternative embodiment of the invention, host 120 may include an IB/PCI bridge.

Device driver(s) 124 may include an existing or later-developed driver for operating one or more of devices 116 of node 110. For example, device drivers 124 may include a PCI driver for a disk drive included in devices 116.

Nexus driver 126 is configured to accept a command or request from a device driver 124, and translate or convert the command into an InfiniBand message (e.g., a SEND message). The message is designed to convey the command (e.g., which may be identified by a class of command or request) and any necessary data or parameters (e.g., an InfiniBand host memory address, R_Key) for executing the command. The nexus driver issues the InfiniBand message to node 110 (via HCA 122).

Thus, in one embodiment of the invention implemented in an environment such as that portrayed in FIG. 1, device driver 124 operates substantially the same as if its corresponding device among devices 116 was local to host 120 rather than remote. Nexus driver 126 combines or augments device driver operations with InfiniBand information to enable HCA 122 to convey an InfiniBand message or communication to node 110.

At node 110, bridge 112 receives the communication, extracts or determines the original operation issued by device driver 124 and executes it. A response, interrupt or other return communication from device 116 and/or bus 114 may be passed to bridge 112 (e.g., from the device). A return InfiniBand message or communication is constructed and transmitted back to host 120.

HCA 122 of host 120 receives the return message and passes it to nexus driver 126. Nexus driver 126 retrieves the response, interrupt or other communication and passes it to device driver 124.

Because a method of implementing the invention may build upon features of InfiniBand technology, reference may be had to the InfiniBand Architecture, Specification 1.0.a, of June, 2001, which is hereby incorporated by reference.

In one embodiment of the invention, the format of communications between an InfiniBand host and a remote node may be based on a standard method of exchanging messages in an InfiniBand environment. For example, the host may issue a SEND message to the node (e.g., the IB/PCI bridge) to convey a command, store or retrieve data on an input/output device, etc. However, the message may contain one or more data fields unique to the IB/PCI protocol provided herein.

In one implementation of this embodiment, the SEND message is populated with the address and size of a host memory buffer holding a service request, and an R_Key for accessing the buffer. The message may also include an indication of the protocol being used (IB/PCI) and/or the version of the protocol.

The SEND message may be directed to a hot plug controller of the remote node, a PCI segment or a particular device. The recipient accesses the specified host memory area to obtain the service request. This access may comprise an RDMA (Remote Direct Memory Access) read operation.

Illustratively, a service request may include a request for a particular operation (e.g., identified by class) and a host request handle (e.g., for identifying the request). The host request handle may be returned as part of a response to the service request. The service request in the host memory buffer may also include one or more parameters for the request, and, for purposes of receiving a response, an IB memory buffer, buffer size and R_Key.

Different types of requests may be issued to different entities within the remote node (e.g., hot plug controller, PCI segment, device). Thus, a hot plug controller may receive a request for slot information, a request to register interrupts, etc. A PCI segment or device may receive a request for resource information, a request to set configuration information, etc.

After the remote node (e.g., hot plug controller, PCI segment, device) completes a service request, the node writes a response to the specified host memory area (e.g., via an RDMA write) if one is warranted. An interrupt or message may be issued to the host to indicate completion of the service request. The host's channel adapter, upon receipt of an interrupt or message announcing the completion of a service request, may then invoke the appropriate handler (e.g., of the PCI nexus driver).

Figure 2:
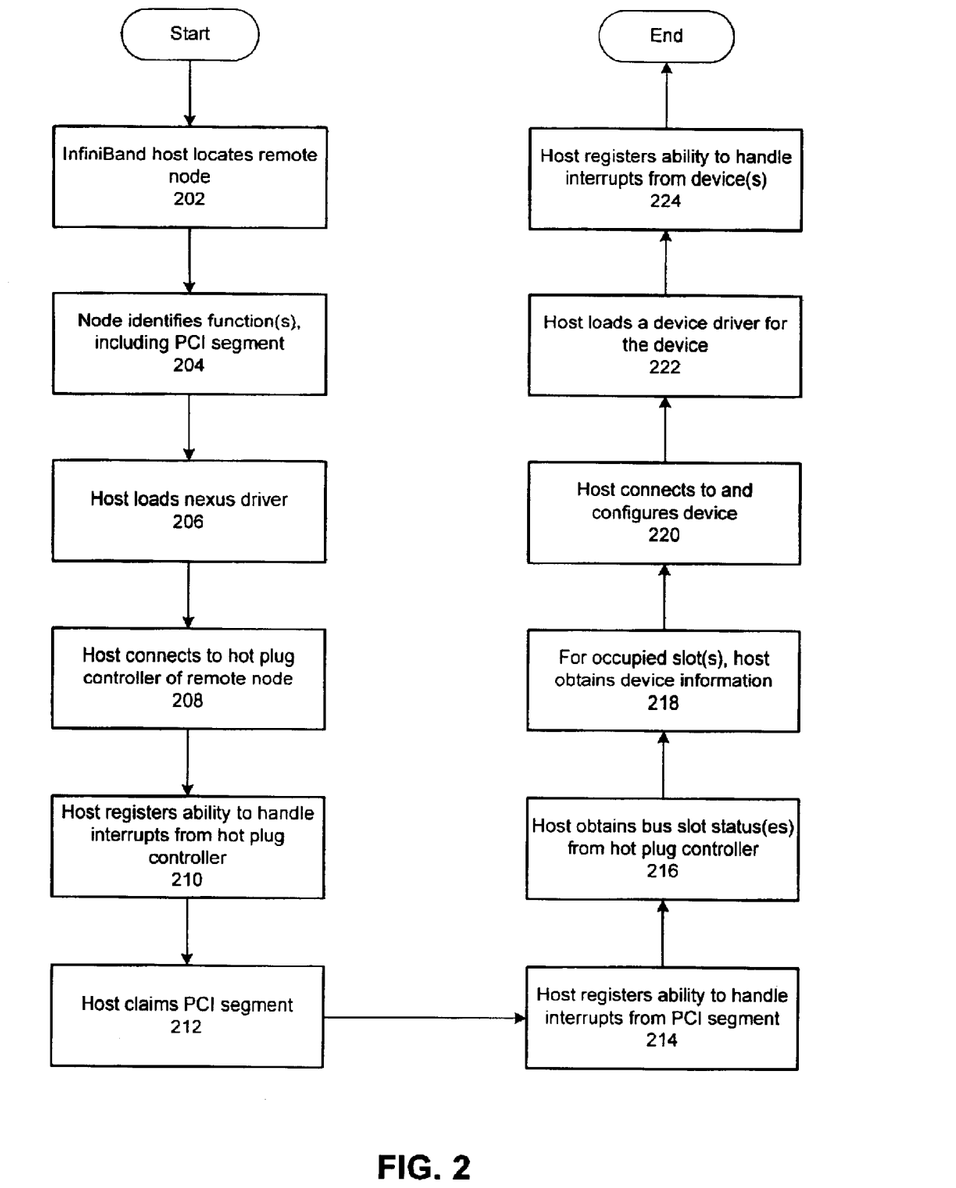
FIG. 2 is a flowchart illustrating one method of establishing access to a local device of a remote node, from a host computer, in accordance with an embodiment of the invention.

FIG. 2 is a flowchart depicting a method of establishing access to a local device of a remote node from an InfiniBand (IB) host, according to one embodiment of the invention. This embodiment of the invention is suitable for implementation in an environment such as that illustrated in FIG. 1.

In this embodiment, the remote node is configured with one or more input/output devices coupled to a local bus (e.g., a bus configured according to PCI or another standard for local communications). The remote node also includes a hot plug controller for enabling hot swapping of a device within the node. The hot plug controller provides the ability to monitor and reconfigure slots of the local bus (e.g., to detect whether power is applied to a slot, to determine whether a device is installed in a slot, to turn a slot's power on or off).

In operation 202, an InfiniBand host locates or identifies a remote node.

In operation 204, the remote node identifies its function(s) or capabilities to the host. In this embodiment, the node's functions include at least one PCI segment or bus. For example, the remote node may comprise an enclosure containing a PCI backplane and one or more PCI devices. The remote node also includes a bridge (e.g., an IB/PCI bridge) or other device (e.g., a target channel adapter) for interfacing between a PCI segment and an InfiniBand link coupling the remote node to the host. In particular, the node may include a TCA that also acts as an IB/PCI bridge. The remote node may or may not include a central processing unit (other than any processor on the bridge).

In an embodiment of the invention, the host issues an InfiniBand IOUnitInfo request to the remote node to determine its function(s). The bridge in the remote node responds with an IOUnitInfo response, the format of which may differ from a standard InfiniBand IOUnitInfo response. For example, data values in the header of the response may include any or all of: an indication of the number of PCI segments (or other local buses) in the node; an indication, for each such PCI segment, of whether it is available; an indication of whether the bridge has a boot PROM or Fcode driver; etc.

The host may also issue an IOControllerProfile request to the remote bridge, which will return an appropriate response. The response may include various standard InfiniBand data fields (e.g., VendorID, DeviceID, version), as well as fields specific to the IB/PCI protocol provided by this embodiment of the invention. For example, a protocol or protocolVersion field may be used to indicate the version of the IB/PCI protocol known to the remote bridge. Another field may indicate the name of the bridge, the number of service entries it offers (e.g., two: PCI segment and hot plug controller).

In operation 206, the host loads a nexus driver. In this embodiment, the nexus driver is a PCI nexus driver designed to translate, modify or convert PCI device commands and requests into InfiniBand format (for transmission to the remote node), and extract responses, interrupts or other PCI device communications from InfiniBand communications received from the remote node. In this embodiment, the PCI nexus driver drives the host InfiniBand interface (e.g., host channel adapter or IB/PCI bridge).

In operation 208, the host (e.g., the PCI nexus driver) logs into and establishes a reliable connection with a hot plug controller of the remote host. The hot plug controller is coupled to one or more PCI segments and can report on, and alter, the status of a segment and bus slots within the segment. This may require the host to first establish a connection (or log into) a PCI segment.

In one embodiment of the invention, a remote node may be configured for multiple types of connection strategies. For example, the node may be set to allow one host at a time to log into or claim, on a first-come, first-served basis, a PCI segment, a hot plug controller or a device on the segment. In another connection strategy, the node may only accept connections from, or allow a PCI segment, hot plug controller or device to be claimed by, a host included in a set of "approved" hosts. In yet another connection strategy, a host (or set of hosts) may "reserve" a PCI segment, hot plug controller or device.

When the host establishes a connection with the remote node, the procedure may be similar to a normal InfiniBand connection request. However, one or more typically unused (i.e., private) data fields of the InfiniBand connection request may be used to indicate what the host is logging into (e.g., PCI segment, hot plug controller) and the reason for the host's login (e.g., determine configuration of a segment, establish a connection with a device).

Thus, operation 208 may involve the host's connection manager establishing contact with the remote hot plug controller, via the remote bridge or TCA. When the host first connects to the remote bridge, it logs in with a login key, which the bridge validates using its connection policy. The remote node may accept or reject the connection. After the host's first connection, the remote bridge may just match the login key received in a subsequent connection (e.g., to a particular device) with the key it received during the first connection, and may reject the connection if they don't match.

In operation 210, the host registers the ability to accept interrupts from the hot plug controller. The host may specify which types of interrupts should or should not be forwarded to it, and may indicate which slots in a PCI segment it will accept interrupts from (e.g., all slots). Illustratively, the host may register this capability with the IB/PCI bridge of the remote node. Each registered interrupt may be mapped to or associated with an interrupt handle for identifying the type of interrupt.

In an embodiment of the invention, there are at least three categories of interrupts the remote node may issue: PCI device interrupts, hot plug controller interrupts and IB/PCI bridge interrupts. Generally, the host registers an interrupt handler with the bridge and identifies the particular interrupts (e.g., by pin number) that it will handle.

Illustratively, hot plug controller interrupts may be grouped into operational interrupts (e.g., removal or insertion of a card) and error interrupts. The hot plug controller (e.g., via the bridge) issues a SEND message to the host when a registered hot plug controller interrupt is detected.

An illustrative SEND message for conveying an interrupt identifies the source of the interrupt (e.g., by host connection or device slot number) and the type of interrupt (e.g., by host interrupt handle).

The host may specifically de-register some or all interrupts of a particular category. And, when the host logs out of the hot plug controller, PCI segment or a device, related interrupts may be automatically de-registered.

In operation 212, the host connects to or claims a particular PCI segment or bus attached to the hot plug controller. In this embodiment, the host uses the same login key that was used in operation 208.

In operation 214, the host registers (e.g., with the bridge of the remote node) the ability to accept interrupts from the claimed PCI segment. The host may specify that it will accept some or all interrupts the segment can or may generate.

In operation 216, the host obtains the statuses of one or more slots of the PCI segment of the remote node. Illustratively, the host may issue a "SlotInfo" service request to obtain slot information. The request may identify one or multiple slots. The hot plug controller may therefore report on the status of one slot at a time, in response to individual queries from the host, or may report multiple statuses concurrently.

In an embodiment of the invention, in response to a SlotInfo request, the remote node (e.g., hot plug controller) informs the host of the number of slots in the PCI segment, and may forward some or all of the following information for each slot: whether the slot is hot-pluggable; whether the slot is ready; whether power is turned on to the slot; whether the slot is occupied by a card or other device; what type of card or device is in a slot; whether the card or device has been configured. In other embodiments, the hot plug controller may provide other information.

The host, in operation 216, may also instruct the hot plug controller to set one or more slots to a desired state. This may cause the hot plug controller to turn power to a specified slot on or off, set a slot status to "ready" or "reset," set a slot status to "healthy" or "not healthy," turn auto-configure on or off, etc. The host may subsequently query the status of the slot to ensure it was set correctly.

In operation 218, the host scans one or more occupied slots. During the scan, the host may access a configuration space of the PCI device occupying a slot. From the configuration space, the host may determine various configuration information More particularly, the host may read the device's BIST (built-in self test), device identification, vendor information, the devices required I/O and memory address space, etc. The host may also identify the function(s) offered by the device.

In different embodiments of the invention, a host may manage resources of devices attached to a PCI segment of a remote node, or the IB/PCI bridge of the remote node may manage the resources. In the illustrated embodiment of the invention, the remote bridge manages the PCI device resources. In particular, the host requests resources for a device (e.g., I/O space, memory addresses, bus device number) from the bridge, the bridge allocates the resources, and the host assigns the resources to the device. The bridge maintains a table or other structure for recording allocated resources. When a device goes offline or is no long needed, the host may instruct the bridge to release the device's allocated resources.

In operation 220, the host establishes connections with one or more devices scanned in operation 218. Illustratively, the same login key used to login to the PCI segment will be used for device connections. When the host connects to a device, the device or node (e.g., the bridge) may return a device handle. The host may then use the device handle for identifying the device during operations (e.g., to transfer data).

The host may also configure or reconfigure one or more devices. For example, using information from the device's configuration space, the host may instruct the bridge of the remote node to allocate a sufficient range of memory addresses and I/O space and/or assign a bus number to the device. The host may then configure the device for the allocated memory range and I/O space. The host may issue multiple SEND messages to a particular device, to write to its configuration space, before the device is fully configured.

The method or type of configuration applied by the host may depend on whether a particular PCI device is a PCI-to-PCI bridge or a device other than a PCI-to-PCI bridge. In particular, the host will connect to any such bridges and repeat the scan and configuration processes for devices coupled to a PCI-to-PCI bridge.

In one embodiment of the invention, three reliable connections are established for each PCI device the host connects to. A first reliable connection is used for RDMA reads and writes (to move data and service requests between the host and the bridge), and for issuing interrupts to the host. For example, when the node completes a service request, it returns a message to the host and signals a completion interrupt.

The second connection is used to increase performance by pre-fetching data. Illustratively, this connection is used to instruct the remote bridge to pre-fetch data from host memory, into memory controlled by the bridge, for transfer to a device.

The third reliable connection is for control purposes, which may be accomplished through the exchange of SEND and RECEIVE messages between the host and the remote node. This connection may be used for managing (e.g., determining, setting) the configuration of a device, for registering interrupts, etc. For example, the device's control connection may be used when the host sends a request to the remote bridge to allocate resources for a device, and when the allocated resources are written to the device's configuration space.

In operation 222, the host loads a device driver for each PCI device it intends to access.

In operation 224, the host registers the ability to handle interrupts from one or more PCI devices. The host may perform such registration for each function offered by the device. Any or al l of the interrupts that may be issued by the device or function may be registered. In one embodiment of the invention, there are at least three types of PCI device interrupts: command completions, DMA transaction completions and errors.

PCI device interrupts, when forwarded to the host, may be passed to the responsible device driver. Also, in order to preserve the ordering of data (i.e., exchanged between the host and the node) and a completion interrupt signaling completion of the data transfer, they may be carried on the same reliable connection. This helps ensure that the interrupt is received after the data.

In an embodiment of the invention, an InfiniBand host may use an enhanced form of the standard InfiniBand Connection Manager connection request to login or connect to a remote node. In particular, the request includes an identification of the host (e.g., a hostID or ownerID), identifies the target of the connection (e.g., a hot plug controller, a PCI segment, a PCI device) and indicates the purpose of the connection.

Illustratively, the host identification may be the hostID for a first connection. For subsequent connections, the host may provide the same host identification (to allow the remote node to validate the host), and may provide additional information for the connection. Such additional information may include a deviceID for a particular device. A deviceID may include a bus number, a device identifier and/or a function identifier.

In this embodiment, the host's first connection to the remote node involves the node's hot plug controller, and serves to "claim" the hot plug controller and the local bus to which the hot plug controller is coupled. Subsequent connections are used to establish reliable connections between the host and particular devices on the local bus.

The remote node (e.g., bridge, hot plug controller, PCI segment, device) may accept or reject a connection request. If rejected, the node may return a reason for the rejection. Illustratively, the target of the connection may be reserved for a different host, may already be owned by a different host, may not be ready for access, etc.

If a connection is accepted, the remote node will indicate the acceptance and may return a handle. For example, the remote node may provide a device handle for identifying a PCI device with which the host has established a connection.

When a host no longer needs a connection, it may logout by initiating a disconnect request. Also, a node may force disconnection of a connection. When logging out, the host may provide the handle given to the host when the connection was accepted. The host may or may not specify a reason for logging out.

Figure 3:
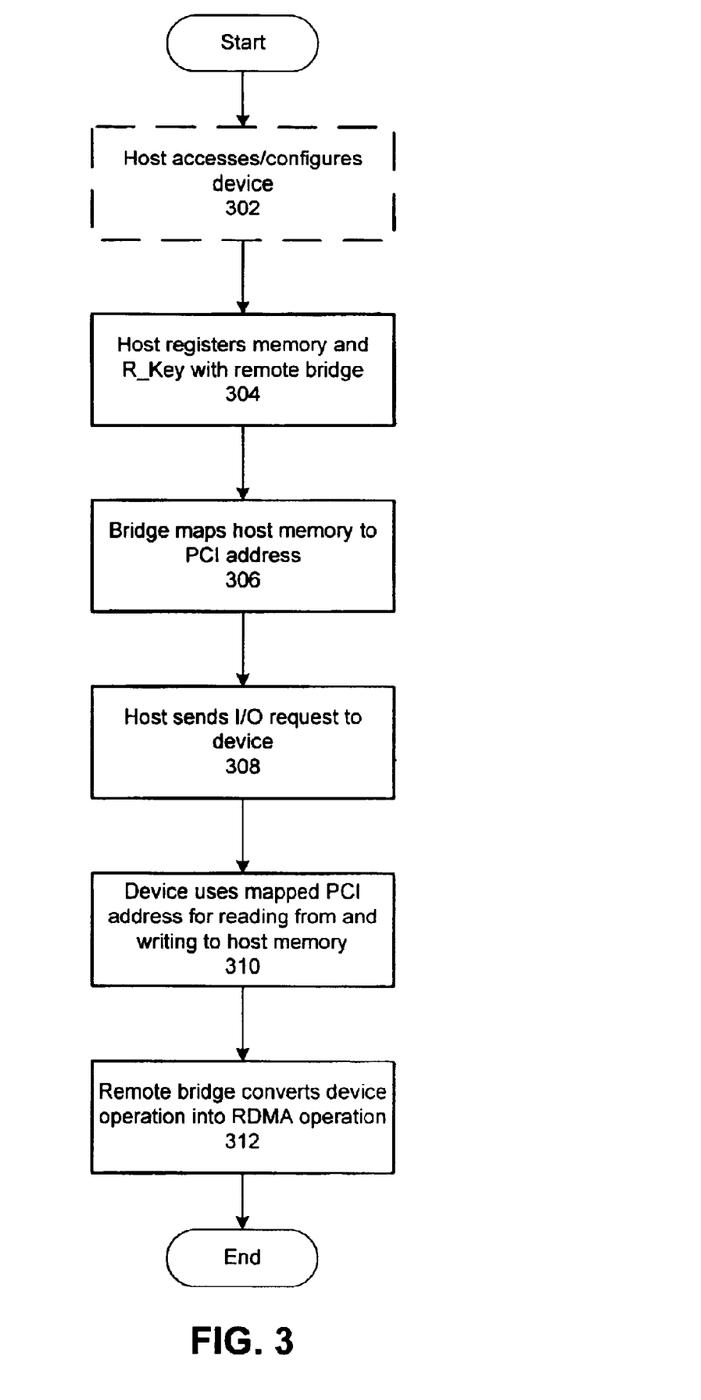
FIG. 3 is a flowchart demonstrating one method of exchanging data between a host computer and a local device of a remote node, in accordance with an embodiment of the present invention.

FIG. 3 demonstrates a method of conducting a data transfer operation between an InfiniBand host and a local (e.g., PCI) device of a remote node, in accordance with an embodiment of the invention.

In operation 302, the host establishes access to the device and may configure it as necessary. For example, a method similar to the method depicted in FIG. 2 may be used for these purposes. As part of this operation, the host establishes one or more reliable connections with the device and/or an IB/PCI bridge through which the host may access the device. The host may also assign I/O and memory address spaces and a PCI bus number to the device.

Configuring the PCI device may entail issuing one or more SEND messages from the host to the remote node. Illustratively, the messages may be addressed to a PCI address that the remote bridge mapped to the device. A configuration message may be constructed with appropriate data fields for reading or writing a configuration detail (e.g., from/to a configuration register of the device). The remote bridge may return a message indicating whether the configuration was successful. If not successful, a reason for the failure may be provided.

In operation 304, the host registers a host memory address and an associated R_Key with the remote bridge or TCA. Illustratively, the host sends a message containing the host memory address, the length of the address (e.g., in bytes or words), the R_Key for the address, and an indication of whether the address should be used for a read operation or a write operation. The host may also specify the word size to be used (e.g., 16 bits, 32 bits, 64 bits), the number of words to be read or written, the PCI address (of the target device) to be written to or read from, and so on. When the host requests the device to read from the host, it may also specify a maximum amount of data to be pre-fetched at a time (e.g., by the remote bridge).

Although the device may read from the host word-by-word, data may be written to the host in burst mode. The host may de-register the specified host address when the data transfer operation is complete or should no longer be used.

In operation 306, the remote bridge maps the specified host InfiniBand address to a local PCI address.

In operation 308, using the assigned local PCI address, the host (e.g., a device driver) issues a read or write request to the device.

In operation 310, the device writes to and reads from the mapped PCI address, as necessary.

In operation 312, the remote bridge converts the device's read and write operations to use the specified host memory. For example, if the device is writing to the host, the bridge stores the specified data in the mapped host InfiniBand memory and issues an RDMA write. If the device is reading from the host, the bridge may issue an RDMA read to retrieve data from the host memory.

In the illustrated embodiment of the invention, the remote bridge may pre-fetch data from the host when the device is performing a data retrieval operation. If the data transfer is aborted or if pre-fetched data are out of synchronization with the host, the host may inform the bridge that data it pre-fetched from the host should be invalidated. In this case, the host may specify the host address from which the data was pre-fetched, and the amount of data to be invalidated. The remote bridge may report back with a status of the invalidation.

In an embodiment of the invention, PCI access errors may be detected by either or both of the IB/PCI bridge of the remote node, or a device within the node. When the device detects an error (e.g., data or address parity error), it generates an interrupt to the bridge; the bridge then constructs and sends an interrupt to the host. When the bridge detects an error during a programmed I/O read or write from the host, the bridge will RDMA the error status to the host return buffer for the I/O operation.

In an embodiment of the invention in which the remote node includes a service processor or central processing unit, a mechanism may be provided for enabling pass-through communications between the host and the service processor. For example, if the host detects a significant error in a remote node, it may invoke a BIST on one or more devices of the node and send resulting diagnostic information to the service processor through this pass-through protocol.

The PCI nexus driver on the host does not attempt to translate the information sent in pass-through mode. Illustratively, the host issues a SEND message to the remote bridge, with a data field containing the information to be provided to the service processor. The bridge then submits the information to the service processor.

Thus, an embodiment of the invention provides a protocol for accessing a device configured for local access (e.g., according to PCI or some other local input/output communication specification) from a remote host (e.g., an InfiniBand host). The protocol enables the host to log into the remote node, connect to a PCI segment or bus, claim one or more devices on the segment, and control the device by exchanging commands and/or data expressed in the device's format (e.g., PCI) via the host's communication format (e.g., InfiniBand).

The foregoing embodiments of the invention have been presented for purposes of illustration and description only.

They are not intended to be exhaustive or to limit the invention to the forms disclosed. Accordingly, the scope of the invention is defined by the appended claims, not the preceding disclosure.

What is claimed is:

1. A method of accessing a PCI (Peripheral Component Interconnect) device from an InfiniBand host computer, comprising:

at an InfiniBand host computer, locating a remote node having a PCI segment comprising one or more PCI devices;

loading an InfiniBand/PCI nexus driver configured to enable the host computer to access the PCI segment of the remote node across an InfiniBand network coupling the host computer to the remote node;

establishing a connection with the PCI segment of the remote node;

identifying one or more PCI devices coupled to the PCI segment;

loading a device driver for a first PCI device within the remote node; and exchanging data between the host computer and the first PCI device by:
registering a host computer memory address with the remote node;
mapping said host computer memory address to a local PCI address; and
transferring the data via the mapped local PCI address.

2. The method of claim 1, further comprising:

receiving a completion message from the remote host indicating that the data were transferred.

3. The method of claim 2, wherein the completion message comprises an interrupt.

4. The method of claim 1, wherein said establishing a connection comprises:

establishing a connection between the host computer and a hot plug controller within the remote node.

5. The method of claim 4, wherein said identifying comprises:

requesting from the hot plug controller configuration information regarding one or more interface slots of the PCI segment.

6. The method of claim 1, wherein said establishing a connection comprises:

establishing a connection between the host computer and the PCI segment.

7. The method of claim 1, wherein said establishing a connection comprises:

establishing a connection between the host computer and the first PCI device.

8. The method of claim 7, further comprising:

reading a configuration space of the first PCI device to determine one or more resource requirements of the first PCI device.

9. The method of claim 8, further comprising:

requesting the remote node to allocate a resource for the first PCI device.

10. The method of claim 9, further comprising:

configuring the first PCI device with said allocated resource.

11. The method of claim 1, wherein said establishing a connection comprises:

logging into the remote node.

12. The method of claim 1, further comprising:

registering with the remote node the host computer ability to handle interrupts from the remote node.

13. The method of claim 12, wherein said interrupts include interrupts generated by a hot plug controller within the remote node.

14. The method of claim 12, wherein said interrupts include interrupts generated on the PCI segment.

15. The method of claim 12, wherein said interrupts include interrupts generated by the first PCI device.

16. The method of claim 1, wherein said registering a host computer memory address comprises:

sending a message to the remote node identifying the host computer memory address and an R_Key for accessing the host computer memory address.

17. A computer readable storage medium storing instructions that, when executed by a computer, cause the computer to perform a method of accessing a PCI (Peripheral Component Interconnect) device from an InfiniBand host computer, the method comprising:

at an InfiniBand host computer, locating a remote node having a PCI segment comprising one or more PCI devices;

loading an InfiniBand/PCI nexus driver configured to enable the host computer to access the PCI segment of the remote node across an InfiniBand network coupling the host computer to the remote node;

establishing a connection with the PCI segment of the remote node;

identifying one or more PCI devices coupled to the PCI segment;

loading a device driver for a first PCI device within the remote node; and exchanging data between the host computer and the first PCI device by:
registering a host computer memory address with the remote node;
mapping said host computer memory address to a local PCI address; and
transferring the data via the mapped local PCI address.

18. A method of accessing a local input/output device of a node remote from a host computer, comprising:

establishing a connection between the host and a hot plug controller in the node;

receiving from the hot plug controller a status of one or more interface slots of a local communication bus in the node, including a first slot coupled to the local input/output device;

retrieving configuration information from the local input/output device;

configuring the local input/output device for exchanging data with the host; and mapping a memory address of the host to a local address of the local input/output device;

wherein said mapped memory address is used for transferring data between the host and the local input/output device.

19. The method of claim 18, further comprising:

registering with the node the host's ability to handle interrupts from the hot plug controller.

20. The method of claim 18, further comprising:

registering with the node the host's ability to handle interrupts from the local communication bus of the node.

21. The method of claim 18, further comprising:
registering with the node the host's ability to handle interrupts from the local input/output device.

22. The method of claim 18, wherein said establishing a connection comprises:
logging the host into a channel adapter of the node.

23. The method of claim 18, wherein said establishing a connection comprises:
logging the host into the hot plug controller.

24. The method of claim 18, wherein said establishing a connection comprises:
connecting the host to the local communication bus.

25. The method of claim 18, further comprising:
loading in the host a device driver for the local input/output device; and
loading in the host a nexus driver configured to translate an instruction from the device driver for transmission to the node.

26. The method of claim 18, wherein said retrieving configuration information comprises:
reading a configuration space of the local input/output device.

27. The method of claim 26, wherein said configuring the local input/output device comprises:
writing a local bus memory address to the configuration space from the host; and
writing an input/output address to the configuration space from the host.

28. The method of claim 18, wherein said mapping a memory address comprises:
registering with the node a host memory address and a key for accessing said host memory address; and
at the node, mapping said host memory address to a first local bus address.

29. The method of claim 28, further comprising:
writing data from the local input/output device to the first local bus address; and
transferring the data to said host memory address.

30. The method of claim 28, further comprising:
storing data at said host memory address to be transferred to the local input/output device; and
at the node, retrieving the stored data.

31. The method of claim 18, further comprising:
issuing a command from the host to the remote node to transfer a set of data from the host to the local input/output device;
facilitating pre-fetching of a portion of said set of data by a network interface of the remote node; and
if said pre-fetched portion of said set of data loses synchronization with the host,
instructing the network interface of the remote node to invalidate said pre-fetched portion of said set of data.

32. The method of claim 18, further comprising:
issuing a pass-through command from the host to a processor within the remote node;
wherein said pass-through command is received by a network interface of the remote node and passed to the processor.

33. A computer readable storage medium storing instructions that, when executed by a computer, cause the computer to perform a method of accessing a local input/output device of a node remote from a host computer, the method comprising:
establishing a connection between the host and a hot plug controller in the node;
receiving from the hot plug controller a status of one or more interface slots of a local communication bus in the node, including a first slot coupled to the local input/output device;
retrieving configuration information from the local input/output device;
configuring the local input/output device for transferring data with the host; and
mapping a memory address of the host to a local address of the local input/output device;
wherein said mapped address is used for transferring data between the host and the local input/output device.

* * * * *